Nov. 25, 1930.  W. R. OBER  1,783,026
TRANSPLANTING DEVICE
Filed March 5, 1929
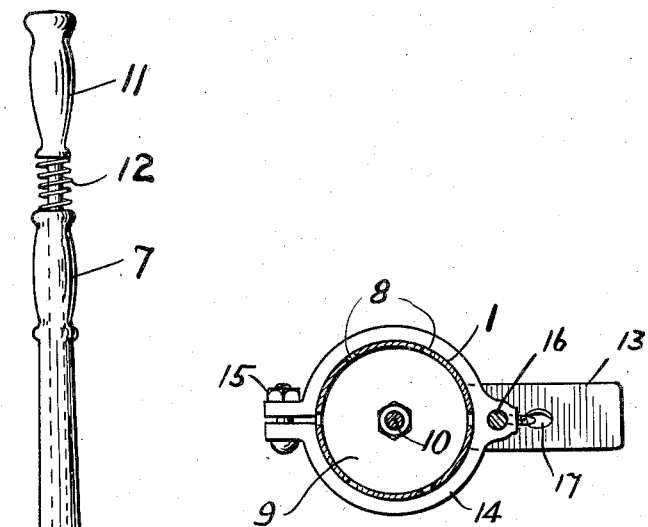
FIG. 2.
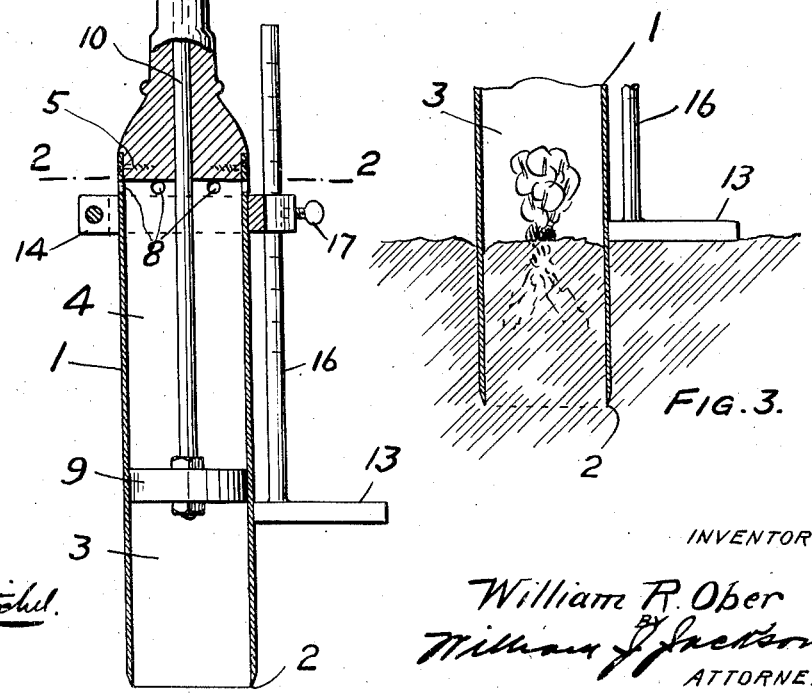
FIG. 1.
FIG. 3.
WITNESS:
INVENTOR
William R. Ober
ATTORNEY.

Patented Nov. 25, 1930

1,783,026

UNITED STATES PATENT OFFICE

WILLIAM R. OBER, OF LLANERCH, PENNSYLVANIA

TRANSPLANTING DEVICE

Application filed March 5, 1929. Serial No. 344,312.

My invention relates to horticultural implements and is designed to provide a simple, cheap, and more efficient device than similar apparatus upon the market. My device is arranged for performing through manual manipulation the operations of cutting the roots, lifting the plant and transporting and planting it again in a new position without injury to the plant or retardation to its growth.

My invention is in the nature of a lifter and ejector in which I make use of an air-pump operating in connection with other devices on the principle of suction to lift the plant out of the soil, and by compression to force the plant and its core of earth out into a hole made for it in planting again, whereby a perfectly even distribution of power is applied to the plant and its core of earth in lifting it out and planting it again without breaking the core of adhering earth or bruising the plant.

The leading object of the present invention, therefore, may be said to reside in the provision of a novel construction, arrangement and combination of parts for attaining the results above set forth.

Other and further objects not at this time set forth will hereinafter appear.

The invention consists of the novel construction hereinafter described and finally claimed.

The nature, characteristic features and scope of the invention will be more fully understood from the following description taken in connection with the accompanying drawings forming part hereof, and in which:

Fig. 1, is a view in elevation, partly sectioned, of a device embodying the invention.

Fig. 2, is a sectional view taken upon the line 2—2 of Fig. 1.

Fig. 3, is a fragmentary view in section thereof and illustrating the manner of digging a plant for transplanting purposes.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Primarily the device is arranged to be readily carried from place to place and in which a stand is not necessary or desirable. Generally stated, the device comprises a combined transplanting shell and air pump, a piston and piston rod and its handle, a casing through which the piston operates, a spring between the piston handle and top of said casing, and an adjustable foot treadle.

The reference numeral 1 designates a shell forming a combined transplanting chamber and air chamber. The shell casing is sharpened at its lower end, as at 2, to facilitate cutting purposes. The transplanting chamber is designated 3 and the air chamber 4. The purpose of the transplanting chamber is to slightly compress the soil and mellow it about the plants, to cut the roots of the plants, and to hold the plants, roots, and soil about them for deposit into their new position or location. The shell 1 is of the same diameter throughout its extent and is made of thin metal. By making the shell of the same diameter throughout its extent a very long stroke of plunger may be obtained and which cannot be successfully employed where the transplanting chamber and air chamber are of different diameters.

The shell 1 is secured by means of screws 5 to the casing 6 which is of the same diameter as the shell 1 at its bottom and gradually tapers to a hand grip 7 and is made of wood. The air chamber 4 is provided with ports 8 so that a suction may be created by piston 9 to lift the plant and its plug or core of earth by an upward movement of the piston, while by a downward stroke of the piston the air beneath it is compressed and the contents of shell are expelled into their new position. The ports facilitate the easy movement of the piston not otherwise obtainable.

9 is a piston fitted into shell 1, carries piston rod 10, and is made of any suitable material adapted to compress the air in air cylinder 4.

Fitted to the top of the piston rod is a handle 11, preferably made of wood. The vertical axis of the handle 11 is in parallelism with the vertical axis of the piston rod. Fitted between the bottom of handle 11 and the top of hand grip 7, and coiled around the piston rod is a spring 12.

The reference numeral 13 designates a foot bracket or rest adjustably fastened to split ring 14. The split ring is adjustable vertically of the shell 1 by means of nut 15 and the stem 16 of foot rest 13 is adjustable vertically of the split ring. Thus, a very large range of adjustments may be effected when transplanting vegetation which varies in height. The stem 16 is provided with a scale to attain exact measurements. The vertical axis of the stem parallels the vertical axis of the piston rod and is arranged close to one side of the shell and the stem is unrestricted as to vertical movement except by its nut 17.

In operating my transplanter, an opening is made with the device where it is desired that the plant shall stand. The device is then set immediately over the plant to be removed and the shell forced down to a previously ascertained depth to cut all side roots. The piston is now pulled up and the plant is held and drawn out by the combined influence of frictional compression and suction. The device is then set immediately over the opening prepared for the plant and the piston is forced downward against spring 12. The air is thereby compressed in air cylinder and the plant quickly and firmly forced into position, and the shell instantly and simultaneously withdrawn through the medium of the spring 12.

The advantages of my device over commercial transplanters lies in the fact that first I provide the shell 1 of same diameter throughout its extent, thus permitting longer piston strokes and also cheapening construction since commercial pipe may be used. Second, by having the casing taper from the shell to the hand grip I am enabled to obtain a very compact and easily handled device. Thus, by having the foot rest adjustable vertically with respect to the collar and the collar adjustable vertically and rotatably with respect to the shell a large range of adjustment may be made. The hand grip is in a convenient place at the top of the casing and spring, handle, and hand grip all have their axes in parallelism and completing the generally tapered effect. This tapered effect has two purposes. It not only lightens the structure where desired by the operator, but the general tone or effect of the device is much enhanced.

I am aware that the invention may be embodied in other specific forms without departing from the spirit or essential attributes thereof, and I therefore desire the present embodiment to be considered in all respects as illustrative and not restrictive, reference being had to the appended claim rather than to the foregoing description to indicate the scope of the invention.

What I claim is:

A device of the character stated comprising an elongated cylindrical shell of thin material having a positively closed top and an open bottom, said shell being of equal diameter throughout its extent having at its lower end an outwardly bevelled annular cutting portion, said shell forming a combined transplanting chamber and air compression chamber, said air compression chamber being provided with an annular series of ports at its top, a casing of relatively thick material extended from said shell in a tapering manner and having a hand grip formed integral therewith at its top, a piston rod extended through said casing which is solid, a piston, a vertically disposed handle for said piston rod the vertical axis of which parallels the vertical axis of the cylinder, a coiled spring between the top of said hand grip and the bottom of said handle, a split ring adjustable vertically and horizontally with respect to said shell, a vertical stem carrying a horizontal foot rest adjustable vertically of said split ring, and a thumb nut for securing said foot rest in adjusted position, whereby the lowest position of the piston may be accurately gauged for compression purposes for expelling a plant without interfering with that part contained in the cylinder.

WILLIAM R. OBER.